(No Model.)
M. B. PARKER.
GOPHER EXTERMINATOR.
No. 400,705. Patented Apr. 2, 1889.
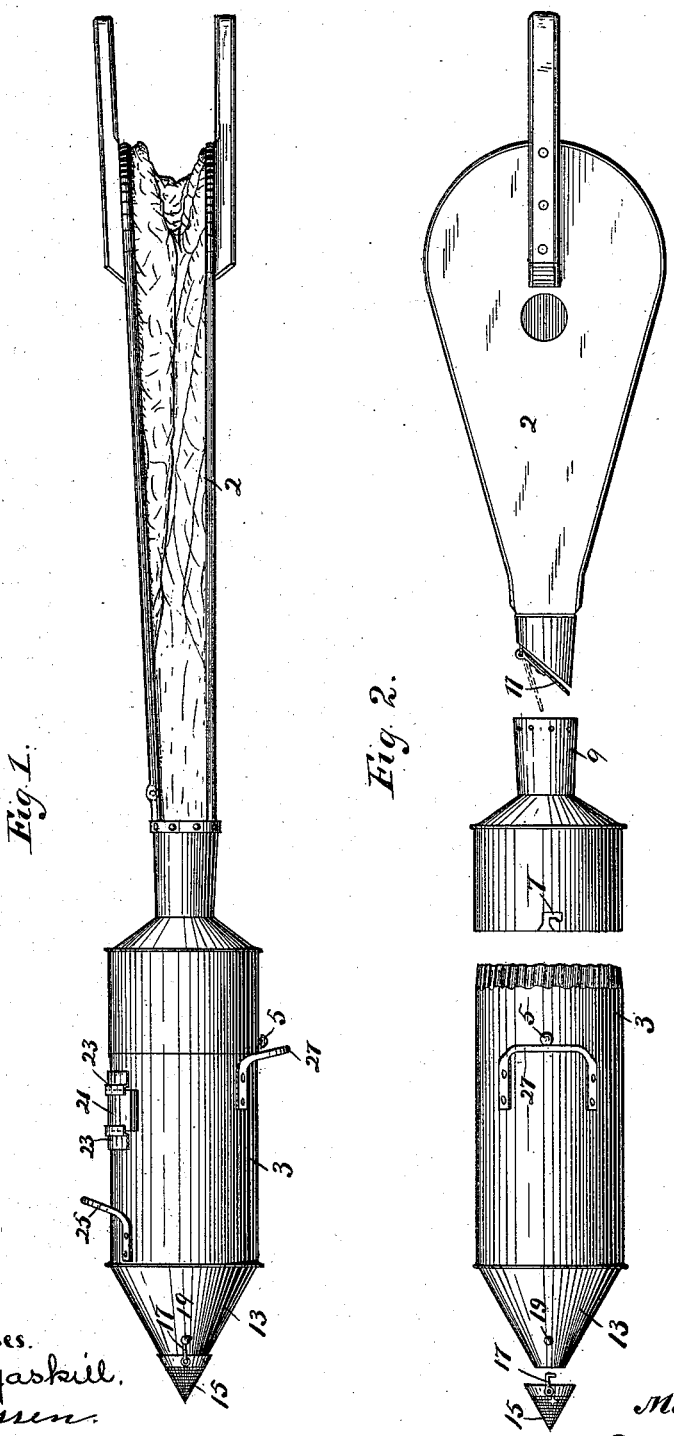
Witnesses.
a. m. gaskill.
J. Jessen.
Inventor.
Martin B. Parker.
By Paul & Merwin attys

UNITED STATES PATENT OFFICE.

MARTIN B. PARKER, OF BLUE EARTH CITY, MINNESOTA.

GOPHER-EXTERMINATOR.

SPECIFICATION forming part of Letters Patent No. 400,705, dated April 2, 1889.

Application filed January 29, 1889. Serial No. 297,948. (No model.)

*To all whom it may concern:*

Be it known that I, MARTIN B. PARKER, of Blue Earth City, in the county of Faribault and State of Minnesota, have invented certain Improvements in Gopher-Exterminators, of which the following is a specification.

The object of this invention is to provide an apparatus by means of which gophers and other animals which burrow in the ground may be rapidly exterminated.

The invention consists, generally, in the construction and combination hereinafter described, and particularly pointed out in the claim.

In the accompanying drawings, forming a part of this specification, Figure 1 is a plan view of my improved device. Fig. 2 is a side elevation of the same, the parts being separated or detached.

In the drawings, 2 represents a hand-bellows of any convenient size and shape. The forward end of this bellows is connected to a metallic combustion-chamber, 3. This combustion-chamber is preferably formed of sheet-iron, with the joints seamed together, and it is preferably made in two sections, which telescope together and are secured by a pin, 5, which engages a bayonet-joint slot, 7. The rear end of the combustion-chamber is provided with a tube, 9, which fits upon the end of the bellows 2 and may be secured thereto by any suitable means. The end of the bellows is preferably cut off at an angle, as shown in Fig. 2, and is provided with a valve, 11, hinged at its top and adapted to rest upon the inclined end of the bellows, thus closing the same.

The combustion-chamber 3 is preferably provided with the conical end 13, having an opening at the center thereof. A conical wire strainer or spark-arrester, 15, is adapted to be slipped over the end of the combustion-chamber, where it is secured by means of a hook, 17, which engages the pin 19. I also prefer to provide the wall of the combustion-chamber with a sliding door, 21, which is adapted to be held in place by ledges 23. This door may be slid around the combustion-chamber, moving under the ledges 23, so that the door may be opened to a greater or less extent. I also prefer to provide the combustion-chamber with the two handles 25 and 27.

The manner of using this device is as follows: The combustion-chamber is filled with straw or hay or other combustible material, over which is sprinkled sulphur or other suitable substance. The two sections of the combustion-chamber are then secured together, the door 21 is opened, and a light is applied to the material in the combustion-chamber. The door is then closed, and, the bellows being operated, the smoke is forced through the conical end of the combustion-chamber. The sparks are prevented from escaping by means of the spark-arrester 15. The conical end of the combustion-chamber being introduced into the end of a burrow, the smoke is forced into the burrow, and the animals which may be therein will be very quickly suffocated.

The device may be used for exterminating gophers, foxes, rats, and other animals.

In using the device it will generally be carried, when not in use, under the arm of the operator, the bellows being in the position shown in Fig. 2. The inclined valve 11 will then rest upon the inclined end of the bellows. The door 21 will be slightly opened, so as to permit sufficient air to enter the combustion-chamber to keep the fire alive when the device is not in use, but is being carried from one burrow to another. The valve, being closed, will then prevent the smoke from passing back into the bellows.

I claim as my invention—

The combination, with the bellows having the inclined end and the valve 11, hinged upon said end, of the combustion-chamber 3, provided with a tube, 9, fitting upon the end of the bellows, and with a conical end, the conical spark-arrester fitting over the end of said combustion-chamber and provided with the fastening-hook 17, the ledges 23 upon the sides of the combustion-chamber, and the door 21, sliding under said ledges, all substantially as described, and for the purpose set forth.

In testimony whereof I have hereunto set my hand this 25th day of January, 1889.

MARTIN B. PARKER.

In presence of—
 A. C. PAUL,
 A. M. GASKILL.